United States Patent [19]
Hughen

[11] Patent Number: 5,612,151
[45] Date of Patent: Mar. 18, 1997

[54] ELECTROCHEMICAL CELL LABEL WITH INTEGRATED TESTER

[75] Inventor: John F. Hughen, Rancho Cucamonga, Calif.

[73] Assignee: Duracell Inc., Bethel, Conn.

[21] Appl. No.: 625,827

[22] Filed: Apr. 1, 1996

Related U.S. Application Data

[62] Division of Ser. No. 315,317, Sep. 29, 1994, Pat. No. 5,578,390.
[51] Int. Cl.⁶ .................................................. H01M 10/48
[52] U.S. Cl. ................................................ 429/93; 324/435
[58] Field of Search ............................. 429/91, 92, 93; 324/435

[56] References Cited

U.S. PATENT DOCUMENTS

| | | |
|---|---|---|
| 1,497,388 | 6/1924 | Sterling . |
| 4,608,323 | 8/1986 | Zaborney . |
| 4,702,563 | 10/1987 | Parker . |
| 4,702,564 | 10/1987 | Parker . |
| 4,717,710 | 1/1988 | Shimizu . |
| 4,723,656 | 2/1988 | Kiernan . |
| 4,737,020 | 4/1988 | Parker . |
| 4,812,541 | 3/1989 | Mallya . |
| 4,835,476 | 5/1989 | Kurosawa . |
| 5,015,544 | 5/1991 | Burroughs . |
| 5,059,895 | 10/1991 | Cataldi . |
| 5,128,616 | 7/1992 | Palmer . |
| 5,156,931 | 10/1992 | Burroughs . |
| 5,188,231 | 2/1993 | Kivell . |
| 5,190,609 | 3/1993 | Lin . |
| 5,223,003 | 6/1993 | Tucholski . |
| 5,250,905 | 10/1993 | Kuo et al. ........................ 429/91 X |
| 5,409,788 | 4/1995 | Weiss et al. ........................ 429/93 |

FOREIGN PATENT DOCUMENTS

523901  1/1993  European Pat. Off. ....... H01M 10/48

*Primary Examiner*—Stephen Kalafut
*Attorney, Agent, or Firm*—Robert J. Feltovic; Rose M. Allen; Barry D. Josephs

[57] ABSTRACT

A label for an electrochemical cell with a condition tester for the cell integrated with the label to form a label/tester composite is disclosed. The label/tester composite comprises a thermochromic coating in thermal contact with an electrically conductive coating. The label/tester composite is preferably constructed by applying an adhesive to the inside surface of a heat shrinkable base film forming part of the label. A substructure containing a cured conductive coating and preferably also a thermochromic coating is formed on a releasable web. The substructure is transferred from the releasable web to the inside surface of the heat shrinkable base film and in contact with a portion of the adhesive on the base film. A patterned partition insulating coating is then applied over the transferred conductive coating. The label/tester composite is applied to the cell housing. The integrated tester may be manually activated by depressing one or two regions on the surface of the composite. The conductive coating becomes heated and the generated heat causes changes along the thermochromic coating to indicate the condition of the cell.

23 Claims, 8 Drawing Sheets

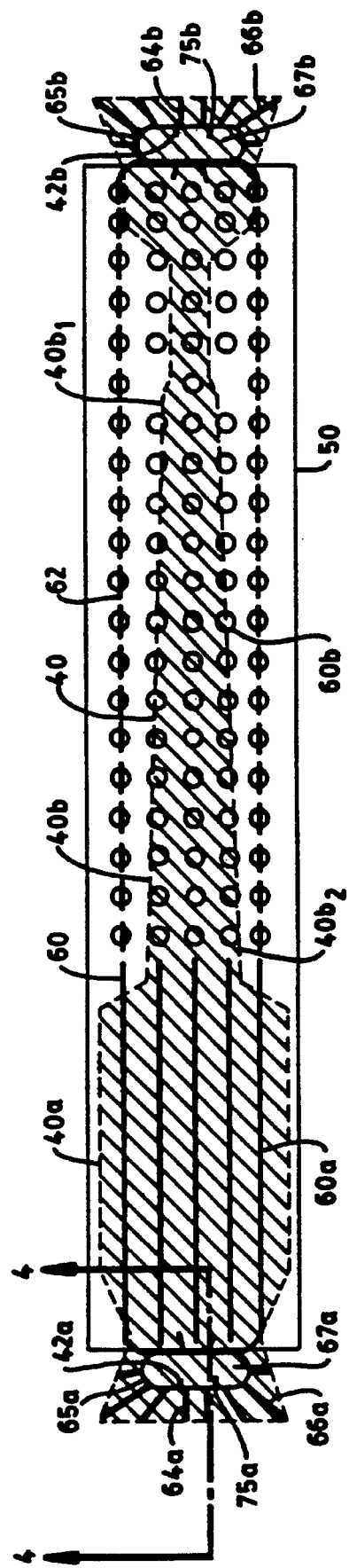

ELECTROCHEMICAL CELL LABEL WITH INTEGRATED TESTER

This application is a divisional of application Ser. No. 08/315,317, filed Sep. 29, 1994, now U.S. Pat. No. 557, 8390.

This invention relates to a label containing an electrochemical cell condition tester thereon and cells containing the label.

Commercially available testers to determine the condition of an electrochemical cell are typically of the thin film heat responsive type. This type of tester typically contains an electrically conductive coating on one side of a heat resistant film and a thermochromic coating on the other side. Such testers are commercially available in the form of strips which are not integrated into the cell or cell label. To use the tester one must apply it to the terminal ends of the cell being tested. This completes an electrical circuit in the conductive coating and causes heating in that coating. The width of the conductive coating can be varied along its length, resulting in the narrower portion being heated to a higher temperature than the wider portion. As a threshold temperature is reached along different portions of the conductive coating, a portion of the thermochromic coating in proximity thereto may change in clarity to reveal an underlying color coating. A graphic scale alongside the various portions of the thermochromic coating indicates the condition of the cell. Examples of such testers and their application are disclosed in U.S. Pat. Nos. 4,723,656 and 5,188,231.

Integration of testers onto cell labels has long been known. (See, e.g. U.S. Pat. No. 1,497,388). However, incorporation of a heat responsive tester of the type disclosed, e.g. in U.S. Pat. No. 4,702,564, using modern technology and high speed equipment poses significant problems. One or more of the tester components, for example the conductive coating, normally requires heat treatment or curing. Modern battery labels are made of heat shrinkable plastic. One significant manufacturing problem has been how to cure the conductive coating without causing deformation or shrinking of the underlying heat sensitive label. Stand alone heat responsive testers have heretofore applied the conductive coating onto a polyester film. Since such film is capable of withstanding the curing temperatures, the conductive coating can be cured while on the film. However, such film is not useful for modern battery labels. This problem has been overcome in accordance with the present invention.

The invention will be better understood with reference to the drawings in which:

FIG. 3 is plan view of a portion of the tester composite of FIG. 1 illustrating preferred partition pattern and underlying conductive coating.

The present invention overcomes the above mentioned impediments to feasible manufacture of reliable on-cell thermochromic testers. The present invention avoids the to cure the conductive coating on the label therby eliminataing deformation or shrinking of the label and making it possible to intergrate a heat responsive tester with the cell label. In the present invention the conductive coating is cured on a releaseble heat resistant web and then transferred from the web to the cell label.

The invention in one embodiment is directed to a label intergrated with a cell condition tester forming a label/tester composite formed by applying a thermochromomic coating onto a portion of a nonconductive heat shrinkable base film; applying an adhesive coating over the thermochromic coating and over at least another portion of the base film on the same side of said film as the thermochromic coating; applying an electrically conductive coating onto a releasable web; heat curing the conductive coating while on the releasable web to form a substructure on the web, said substructure comprising the cured conductive coating and the thermochromic coating; adhering said substructure to the portion of adhesive over the thermochromic coating; removing the releasable web; and applying said base film to the cell housing by contacting exosed portions of the adhesive coating on said film to the housing, whereby at least a portion of said conductive coating is in proximity to a conductive surface in electrical contact with one of the cell's terminals.

In another embodiment the intergrated label/tester composite is formed by applying an adhesive coating onto at least a portion of a side of a nonconductive heat shrinkble base film; applying an electrically conductive coating to a releasable web; heat curing said conductive coating on said web; applying a thermochromic coating over the cured conductive coating to form a substructure on the web, said substructure comprising the cured conductive coating and the thermochromic coating; adhering the substructure to at least a portion of the adhesive on the base film and transferring said substructure from the releasable web to the base film; removing the releasable web; and applying the base film to the cell housing by contacting exposed portions of the adhesive coating on said base film to the housing, whereby at least a portion of said conductive coating is in proximity to a conductive surface in electrical contact with a terminal of said cell.

Figure 1:
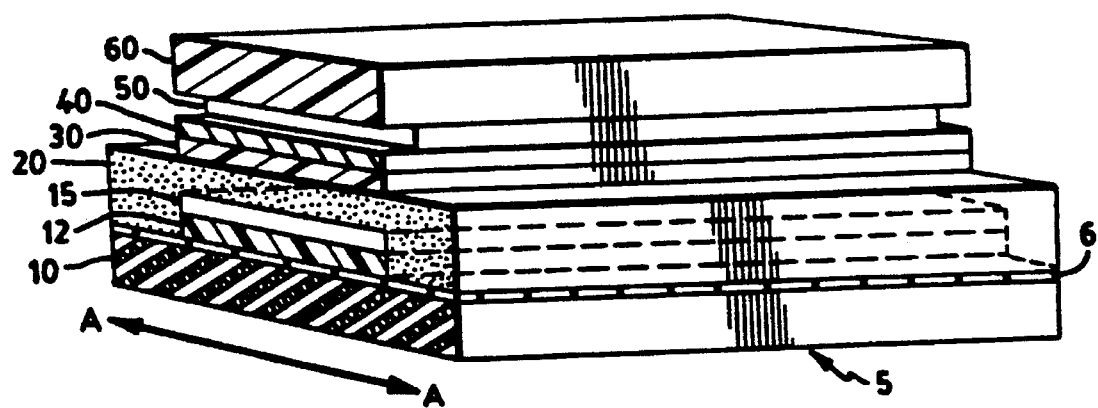
FIG. 1 is an enlarged partial isometric view, shown partially in cross-section, of the composite cell tester integrated with the label and forming the label/tester composite of the invention.

A preferred structure of the composite tester integrated with the cell label (label/tester composite 5) is shown in FIG. 1. The label/tester composite 5 has a thickness under 100 mil (2.5 mm), desirably between about 4 mil and 20 mil (0.1 mm and 0.5 mm). Label/tester composite 5 comprises a label backing 10 (base film), preferably having a print layer 6 on its inside surface. Label backing 10 serves as a substrate for the tester components integrated therewith. Print layer 6 may be formed of conventional non-conductive ink and may contain text, logo, or other printed design giving the cell label an identifiable appearance. Print layer 6 may have void regions, for example, over a portion of the tester creating a window for viewing a color change in the tester when the tester is activated. A heat sensitive coating, preferably a thermochromic coating 12, is formed over a portion of print layer 6. Preferably a color coating 15 is formed over thermochromic coating 12. Label backing 10 is a heat shrinkable film, preferably unplasticized polyvinylchloride or polypropylene. Thermochromic coating 12 may be composed of conventional reversible thermochromic inks. This class of ink is known in the art and, for example, alluded to in U.S. Pat. No. 4,717,710. When the thermochromic coating 12 becomes heated to a response activation temperature, typically of about 37° C., it turns from opaque to clear thereby exposing the underlying color coating 15. A preferred thermochromic ink for use in the composite tester of the invention is available as Type 37 thermochromic ink from Matsui International Co., Inc. Color coating 15 may be any conventional printing ink with colorant chosen to give the coating a sharp, distinct color. Although it is preferable to include color coating 15, this coating could be eliminated by incorporating additional coloring agents within coating 12.

Figure 2A:
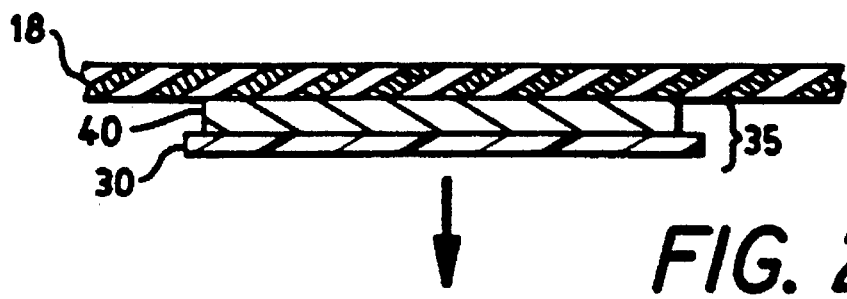
FIGS. 2A and 2B are enlarged end views of intermediate products used in the manufacture of the label/tester composite shown in FIG. 1.
Figure 2B:
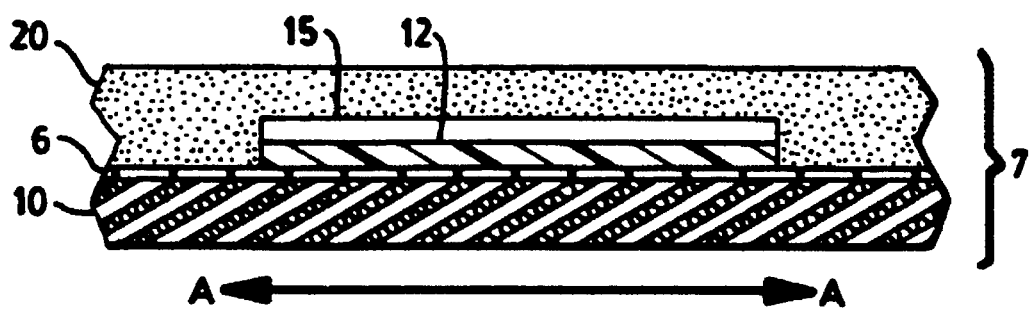
Figure 2C:
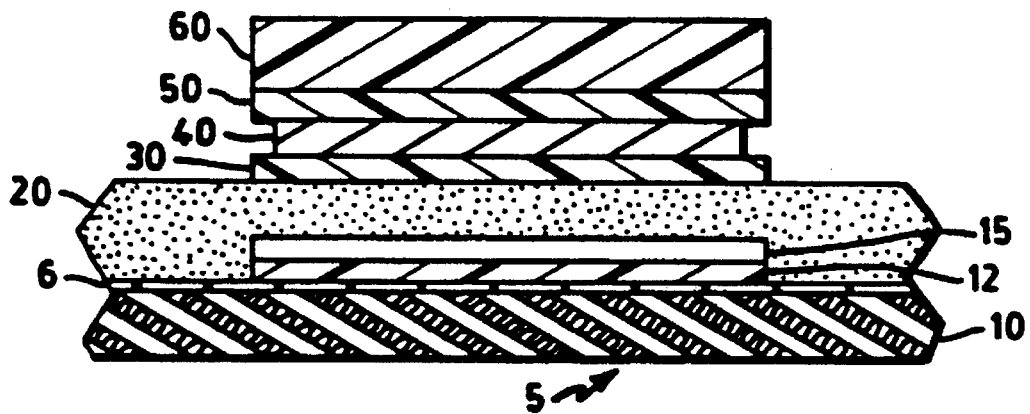
FIG. 2C is an end view of a portion of the completed label/tester composite of FIG. 1.

An adhesive coating 20 is applied over color coating 15 and also directly over the inside surface of the remaining portion of label 10 over print layer 6. Thus, thermochromic coating 12 and color coating 15 preferably lie between label backing 10 and adhesive coating 20, e.g., as shown in FIG. 2C. A conductive coating 40 is located over adhesive 20 in the direction away from the inside surface of label 10. Thus, adhesive 20 will be present between thermochromic coating 12 and conductive coating 40, e.g. as shown in FIGS. 1 and 2C. The adhesive may be selected from a variety of high performance (temperature resistant) pressure sensitive adhesives. Suitable pressure sensitive adhesives are sufficiently tacky to effect transfer of conductive coating 40 from a releasable carrier to label 10 and have adequate peel strength to allow the label to adhere to the cell housing (casing 80, FIG. 5). The adhesive should be sufficiently heat stable so that it does not degrade when the label's edges are heat shrunk over the cell shoulders (130 and 135). To withstand exposure to such heat shrinking, the adhesive should be able to withstand temperatures over about 200° F., for example, about 240° F. (115° C). The high performance adhesive should securely affix the label to the cell casing without causing lifting or excessive shrinking of any portion of the label during the useful life of the cell, even though the cell may be exposed to operating temperatures between about −4° F. and 130° F. (−20° C. and 54° C.). The adhesive also helps to replace prior art heat resistant film, typically polyester, which was commonly employed heretofore to separate the thermochromic coating from the conductive coating. Desirably adhesive coating 20 has a thickness of between about 0.5 and 2.0 mils (0.012 and 0.05 mm) so that heat generated by conductive coating 40 can be adequately transmitted to thermochromic coating 12.

Suitable adhesive 20 may be advantageously selected from the well known acrylic or rubber based class of high performance pressure sensitive adhesives. The adhesive is desirably transparent particularly if a portion of the adhesive is interposed between the label and the thermochromic layer. A suitable adhesive 20 may be formed from a solvent based adhesive polymer solution sold under the trade designation AROSET 1860-2-45 by Ashland Chemical Co., Dublin Ohio. This adhesive and its use is referenced in U.S. Pat. No. 5,190,609. For use in the context of the present invention adhesive 20 may be prepared by first coating a release coated web (not shown), e.g. silicone coated paper, with the AROSET adhesive polymer solution and drying (or curing) the adhesive while still on the web. The dried adhesive 20 may then be transferred from the web to the inside surface of label 10, i.e. over the label's exposed print coating 6 and tester color coating 15 (FIG. 2B).

Alternatively, adhesive 20 may be formed of a high performance curable (crosslinkable) acrylic adhesive as disclosed in U.S. Pat. No. 4,812,541, herein incorporated by reference. Preferred specific compositions for the monomer mixture for use herein to form adhesive 20 are given in the examples of U.S. Pat. No. 4,812,541. For instance, a preferred adhesive 20 may be prepared in accordance with Example 1 or Example 2 of this reference. The uncured adhesive made in accordance with these examples may then be coated directly onto a release coated web, e.g., silicone coated paper (not shown). The coating may then be transferred from the release coated web to the inside surface of label 10 covering the exposed print layer 6 and color coating 12. (If color coating 15 is omitted the prepolymer coating covers the exposed print layer 6 and thermochromic coating 12.) The transferred coating may then be cured to achieve crosslinking by exposing the coating to electron beam radiation at a dosage of 30 kiloGray while in situ on label 10. The crosslinked coating becomes adhesive 20. During the curing process the label temperature does not exceed about 120° F. (48.8° C.) thereby allowing use of heat stretchable film such as unplasticized polyvinylchloride or polypropylene film for label 10.

Conductive coating 40 may be selected from known thin film highly electrically conductive coatings. Advantageously, coating 40 has a thickness of between about 0.25 mil and 1.0 mil (0.006 mm and 0.025 mm), preferably about 0.5 mil (0.012 mm). It may have a sheet resistivity of between about 10 and 100 milliohms/sq. A preferred conductive coating 40 for the composite label/tester of the invention is formed of a polymer based silver ink. This ink is composed of silver flakes dispersed in a polymer solution. A suitable silver ink is available from Olin Hunt Conductive Materials (now sold by Acheson Dispersions) under the trade designation 725A(6S-54) polymer thick high conductive film. It has a sheet resistivity of less than 15 milliohms per sq. @1 mil. The resistivity of the ink and consequently that of conductive coating 40 may be adjusted for better calibration of the tester. This can be done by mixing into the silver ink a polymer based conductive graphite ink having a higher resistivity than the silver ink. A preferred polymer based conductive graphite ink is available under the trade designation 36D071 graphite ink from Olin Hunt Conductive Materials. This material has a sheet resistivity of about 300 ohms/sq. @1 mil. Suitable conductive coating 40 compositions may contain between 75 and 100 wt % silver ink and between 0 and 25 wt % polymer based conductive graphite ink. The sheet resistivity of conductive coating 40 can also be controlled by adjusting its thickness.

The electrically conductive coating 40 is formed by applying the silver ink in varying geometrical patterns, for example, in a pattern which gradually narrows with length. Such patterns for the conductive coating are disclosed, for example, in U.S. Pat. No. 5,188,231, herein incorporated by reference. The silver ink may be applied by conventional printing methods after which it is dried and heat cured. The total resistance of conductive coating 40 may be between about 1 and 2 ohms.

Preferably, as shown in FIG. 1, there is a dielectric ink coating 30 between adhesive 20 and conductive coating 40. Dielectric coating 30 also provides structural support to conductive coating 40 and protects conductive coating 40 from attack by adhesive 20. Dielectric coating 30 desirably has the additional requirement that it does not interfere with the proper shrinkage of the label's major edges 120 and 125 over cell shoulders 130 and 135, respectively, when heat is applied to these edges. Dielectric coating 30 preferably has a thickness between about 0.2 and 0.5 mil (0.005 and 0.012 mm). A preferred dielectric coating 30 is a U.V. (ultra violet light) curable polymer coating containing acrylate functional oligomers such as that available under the trade designation 47MSB132 U.V. Dielectric Blue from Olin Hunt Conductive Materials. Adhesive coating 20 and dielectric coating 30 together have a combined thickness of less than about 1.6 mil (0.04 mm) and together they function as substitute for heat resistant film, e.g. polyester. Dielectric coating 30 can be of a suitable color to eliminate the need for color coating 15.

Preferably, as shown in FIG. 1, another dielectric coating 50 is located over conductive coating 40. Dielectric coating 50 is advantageously included to isolate and insulate conductive coating 40 from the cell housing (casing 80). In a preferred embodiment (FIG. 1) the ends of conductive coating 40 are not coated with dielectric 50, so that they may be pressed into contact with the positive and negative terminals of a cell. A preferred dielectric coating 50 is a U.V. curable polymer coating containing acrylate functional oligomer such as that available under the trade designation 47MSB132 U.V. Dielectric Blue coating from Olin Hunt Conductive Materials. Dielectric coating 50 has a thickness preferably between about 0.2 and 0.5 mils (0.005 and 0.012 mm). Both dielectric coatings 30 and 50 may be conveniently applied by conventional screen printing (flat or rotary screen), gravure or flexographic printing.

Figure 5:
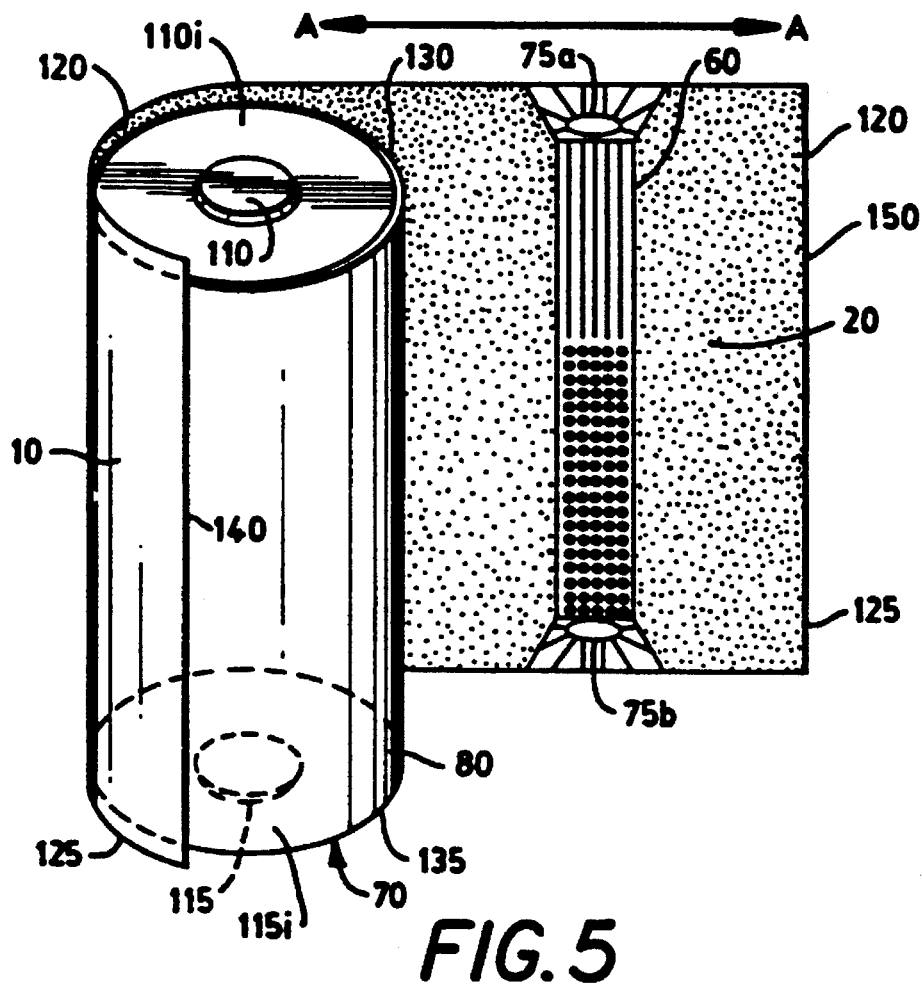
FIG. 5 is a perspective view showing the label/tester being applied to the cell.

A insulating partition coating 60 (FIG. 1) is located over dielectric coating 50. Partition coating 60 electrically insulates conductive coating 40 from cell casing 80 (FIG. 5). Partition coating 60 is multifunctional in that in addition to it being electrically insulating, a portion of it forms a region whereby the tester can be pressed into electrical contact with the terminals. Also, another portion of partition coating 60 provides thermal insulation for the conductive coating 40. When the label/tester composite is applied to the cell partition 60 contacts the cell casing 80 (FIG. 5). Partition coating 6 is applied in a pattern creating cavities that extend clear through the coating thickness. At least a majority of the cavities create air pockets for thermal insulation between conductive coating 40 and cell casing 80 and thus allow the surface of conductive coating 40 to reach higher equilibrium temperature. As illustrated best in FIG. 3 partition coating 60 is formed of a body portion 62 and end portions 64a and 64b (FIG. 3). Body portion 62 desirably has a thickness between about 1.5 mil (0.038 mm) and 3.0 mil (0.075 mm). End portions 64(a) and 64(b) are each located preferably at extremities of partition coating 60 and comprise respective partition extremity portions 65a and 65b, and respective radiating ribs 66a and 66b. As illustrated in FIG. 3, dielectric coating 50 (located between conductive coating 40 and partition coating 60) covers body portion 62 but not extremity portions 65a and 65b. Partition portions 65a and 65b containing one or more cavities, e.g., 67a and 67b, respectively, within their boundary. These cavities form a part of extremities 75a and 75b, respectively. Extremities 75a and 75b allow the ends of conductive coating 40 to make electrical contact with the cell's negative and positive terminals, respectively, when finger pressure is applied to the region of the label directly over both extremities.

The body 62 of the partition pattern will be of relatively greater thickness than the other of the tester coatings in order to create proper partition of the conductive coating 40 from the cell and also to create insulating air pockets under the tester. Various curable materials, for example, acrylate functional epoxies, acrylate functional urethanes, and acrylate functional polyesters having suitable printing and durability characteristics may be employed for partition 60. Such material's are preferably U.V. curable and capable of being printed by screen process (flat or rotary) so that the required degree of thickness between about 1.5 and 7.0 mils (0.038 and 0.175 mm) for the body of the partition can be attained. This degree of thickness would be difficult to attain using solvent based inks or other solvent coating which must be pattern printed. The partition material, as all other tester components, should withstand exposure to elevated temperatures up to about 170° F., commonly employed during cell performance testing.

A preferred material for partition pattern 60 is formed of compounded polymers containing U.V. curable polymer such as acrylate functional epoxy or acrylate functional urethane polymer. The compounded material contains reactive oligomer, reactive monomer and thickening filler. The thickening filler may be silica filler such as AEROSIL 200 from Degussa Inc., Chemicals Division. It gives the material a rheology which makes it easier to print and keeps the material cohesive before curing. A preferred compounded blend for partition coating 60 is: Prepolymer blend product designation EBECRYL 4833 (Radcure Specialties Co., Norfolk Va.) containing urethane acrylate oligomer and N-vinyl-2-pyrrolidone (50 to 80 Wt %); reactive monomer hexane diol diacrylate (20–40 wt %); and AEROSIL 200 (0.1 to 5 wt %). The compounded blend is applied in the desired pattern using conventional screen printing process. The printed material is then cured by U.V. light to produce a hard, manually incompressible and thermally stable partition coating 60 of desired pattern. Partition coating 60 has a thickness between about 0.1 mil (0.0025 mm) and 7 mil (0.175 mm). The partition body portion 62 has a thickness preferably between about 1.5 mil (0.038 mm) and 7 mil (0.175 mm). A preferred partition 60 with conductive coating 40 showing therethrough is illustrated in FIG. 3.

Extremities 75a and 75b (FIG. 3) are comprised of partition end portion 65a and 65b, respectively and a portion of the conductive coating, namely 42a and 42b, respectively. The partition portion 65a and 65b each has a thickness desirably between 0.1 mil (0.0025 mm) and 2.0 mil (0.05 mm). Portion 65a and 42a have a combined thickness between about 0.35 mil (0.009 mm) and 3.0 mil (0.075 mm). Similarly, portion 65b and 42b have a combined thickness between about 0.35 mil (0.009 mm) and 3.0 mil (0.075 mm). The partition portions 65a and 65b form cavities (67a and 67b, respectively) which are advantageously of a polygonal, rectangular, oval, elliptical or circular shaped cavities extending through the thickness of partition coating 60. Since dielectric coating 50 covers only the body portion 62 of partition 60, end portions of conductive coating 40, i.e., portions 42a and 42b, preferably rest directly on partition portion 65a and 65b, respectively, with no coatings intervening therebetween. When the region of the label over conductive portion 42a is pressed, conductive portion 42a pushes down through the cavity 67a in the underlying partition coating and passed partition portion 65a until it makes electrical contact with a cell terminal or conductive surface in electrical contact with a cell terminal.

Similarly when the region of the label over conductive portion 42b is pressed, conductive portion 42b pushes down through the cavity 67b in the partition surface and passed partition portion 65b until it makes electrical contact with a cell terminal or conductive surface in electrical contact with a cell terminal. When pressure is removed the conductive portions 42a and 42b will return substantially to its original position above the partition surface. This may be accomplished many, many times.

There may be a series of ribs 66a and 66b (FIG. 3) radiating away from end portions 65a and 65b, respectively. These ribs tend to converge when the tester/label composite 5 is heat shrunk over the cell shoulders and thus permit extremities 75a and 75b to be heat shrunk neatly over the cell shoulders without bulging or distorting.

The conductive coating 40 normally comprises a low resistance portion 40a and a high resistance portion 40b as shown in FIG. 3. The high resistance portion 40b may have a gradually narrowing width from one end to the other as shown in FIG. 3. The narrower end $40b_1$ will reach higher surface equilibrium temperatures than the wider end $40b_2$ because of higher watt density (power consumed per unit surface area) at the narrower end. In general the high resistance portion 40b will reach higher equilibrium surface temperatures than the low resistance portion 40a because of higher watt density at the high resistance portion. The partition pattern which covers the low resistance portion 40a is in the form of a plurality of parallel ribs 60a, preferably formed of the above disclosed partition material. Ribs 60a preferably extend along the length of the low resistance portion 40a. The partition pattern 60b which covers the high resistance portion 40b may desirably be formed of a plurality of small islands., e.g. dabs, of the partition material, thus creating spaces or cavities therebetween. The islands 60b are of sufficient thickness that they prevent the high resistance portion 40b from accidentally contacting the cell casing or terminals. They are also sufficiently spaced apart that they form a plurality of cavities which create air pockets between the cell casing and conductive portion 40b. The air pockets function to thermally insulate the bottom surface of the conductive coating from the cell casing and thus permit the equilibrium surface temperature of the conductive coating to reach higher levels when the tester is activated. After partition pattern 60 is applied to the coated side (inside surface) of label 10 including the label/tester composite 5 may be protected by applying a release liner (not shown) to cover this surface. The release liner is held in place by exposed portions of adhesive coating 20 on the coated (inside surface) of the label.

A composite tester/label 5 can be manufactured in the following preferred manner: A heat shrinkable label backing 10 may be a base film preferably of unplasticized polyvinylchloride, or polypropylene film preferably of about 6 mils (0.15 mm) thickness is first heat-stretched in the machine direction (the direction in which the label is wrapped around the cell) resulting in a film thickness between about 1.5 and 4 mil (0.0375 and 0.1 mm). If the film is polyvinylchloride the pre-stretching may be accomplished at a temperature of about 230° to 250° F. and the material heat-stretched to about two times its original length. A partial layered substructure 7 (FIG. 2B) is first produced by coating label 10 with print layer 6 using conventional non-conductive inks. The non-conductive ink preferably has a total metal content of less than about 1000 ppm (dried weight basis). The ink should not degrade when exposed to alkaline environment such as may be present during manufacture of the cells. The thermochromic coating 12 may then be applied over a small section of the printed label along the label's width using conventional flat or rotary screen printing method. Thermochromic coating 12 may be U.V. cured whereupon its thickness is between about 1.0 and 3.0 mils (0.025 and 0.075 mm). Thermochromic coating 12 may then be overcoated with color coating 15 by conventional gravure, flexographic, or screen printing process. (Color coating 15 can be eliminated by relying on dielectric 30 to provide the indicator color, which would become visible when thermochromic coating 12 reached its response temperature.) Label 10 may be covered with a coating of adhesive 20 on the printed undersurface of the label. Adhesive 20 may be prepared and applied to the undersurface of the printed label forming substructure 7 in the manner above described.

Next, a transferable layered substructure 35 may be made by coating a heat stable release coated web 18 with a desired pattern of conductive coating 40. Substructure 35 or portion thereof may be referred to herein as a preform. (If the conductive coating is readily curable at a temperature below the temperature at which label 10 begins to shrink or otherwise distort, the conductive coating may alternatively be applied directly onto label 10 and cured thereon, without the need for web 18.) Web 18 may be any heat resistant film, for example, a polyester, paper or polycarbonate film precoated with a conventional release coating, typically silicone. Conductive coating 40 desirably contains a mixture of conductive silver flakes dispersed in a polymer solution as above described. Web 18 with the silver flake dispersion coated thereon is then passed through a heated oven until the coating is sufficiently cured. Advantageously, conductive coating 40 when containing the above referenced Olin Hunt Conductive Material 725A(6S-54), may be quickly cured at a temperature of about 300° F. Cured conductive coating 40 has a thickness of about 0.5 mils (0.012 mm). Thereupon conductive coating 40 is coated with the above referenced (47MSB132 U.V. curable Dielectric Blue) dielectric ink 30 by conventional screen process, gravure or flexographic printing. (Optionally, thermochromic coating 12 could be applied directly over dielectric ink 30 while ink 30 is still on web 18 instead of applying coating 12 over print layer 6.) Web 18 containing dielectric ink 30 is passed through a conventional U.V. curing unit to polymerize and cure the coating. The layered substructure 35 (FIG. 2A) composed of conductive coating 40 coated with dielectric ink 30 may then be transferred from web 18 to layered substructure 7 (FIG. 2B) by pressing the exposed dielectric coating 30 to the bottom of adhesive portion 20. Thereupon, web 18 can be easily removed from substructure 35 by peeling, thereby leaving substructure 35 adhered to substructure 7.

A second dielectric ink coating 50 which may be of same composition, but preferably of different color shade, as dielectric ink 30 (e.g. 47MSB132 U.V. Dielectric Blue) may be coated in any desired pattern directly onto the exposed conductive coating 40. Dielectric coating 50 may be printed onto conductive coating 40 by employing conventional screen process, gravure or flexographic printing technique. The coating 50 is then cured in conventional manner by subjecting it to irradiation from mercury vapor lamps, whereupon it has a thickness of about 0.2 mil.

After dielectric coating 50 has been applied and cured a partition pattern 60 is then applied over coating 50. Partition pattern 60 is preferably composed of a prepolymer blend of acrylated urethane oligomer (or acrylated epoxy oligomer), reactive monomer and thickening filler such as AEROSIL 200, as above referenced. The blend is advantageously applied by conventional flat or rotary screen process printing methods. In this process a screen fabric is coated to a stencil thickness of 18 to 80 microns. The screen mesh is desirably between about 100 and 200 threads per inch. The printed blend is then U.V. cured. The cured partition pattern 60 has a thickness of between about 1.5 and 7 mils (0.038 and 0.175 mm). The layered construction of composite label/tester 5, shown best in FIGS. 1 and 2C, is now complete. It may be protected with a release liner and stored until it is desired to apply it to the cell.

Figure 6:
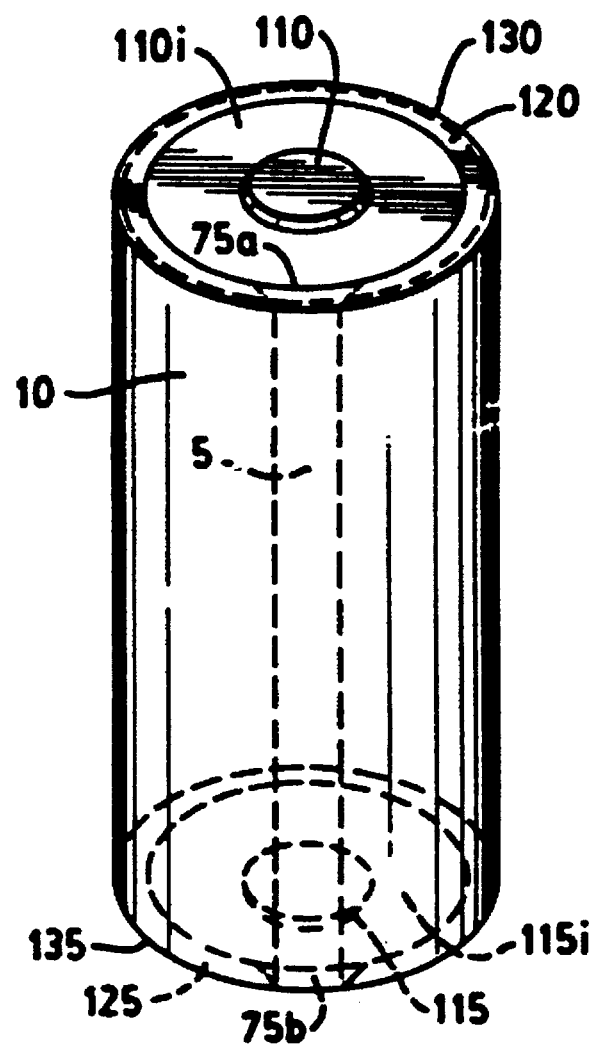
FIG. 6 is a perspective view showing the label/tester secured to the cell with the negative end of the cell visible at the top of the illustration.

The label/tester composite 5 of the invention has edges 140 and 150 and is applied to a cell by first removing the release liner from the label and wrapping the label around the cell casing 80 of cell 70 as illustrated in FIG. 5. Exposed portions of adhesive coating 20 adhere to the cell casing. As aforementioned, the label edges 120 and 125 are preferably devoid of exposed adhesive. After the label is wrapped around the casing, heat may be applied to label edges 120 and 125 to heat shrink these edges around the cell shoulders 130 and 135, resulting in the configuration shown in FIG. 6. Since extremities 75a and 75b are preferably adjacent respective label edges 120 and 125, these extremities will also become heat shrunk over the cell shoulders 130 and 135, respectively. They will thereby come to rest in close proximity to cell surfaces 110i and 115i, respectively, as shown in FIG. 6. Cell portions 110i and 115i in turn are in electrical contact with the cell's terminal ends 110 and 115, respectively. After the label/tester 5 is secured to the cell, the portions of conductive coating 40 which form extremities 75a and 75b will remain insulated from electrical contact with the cell's terminals by partition portions 65a and 65b, respectively, until the tester is activated. The tester may be activated by manually pressing the surface of label 10 simultaneously over regions 42a and 42b.

Figure 4:
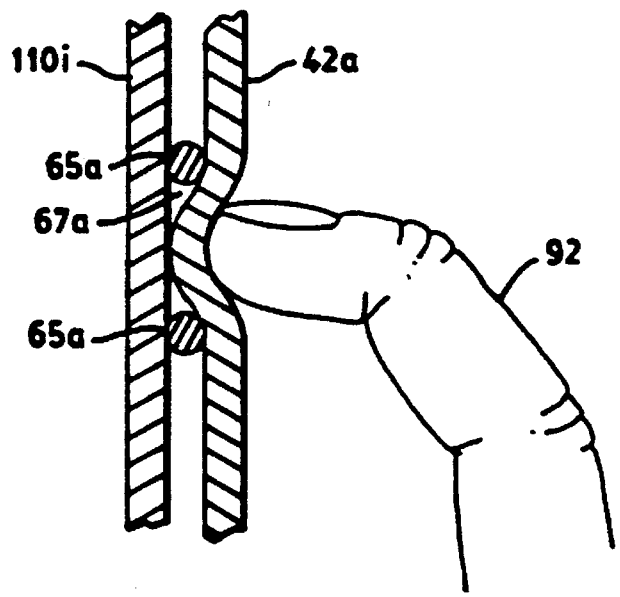
FIG. 4 is an enlarged cross sectional representation of a contact area shown with the conductive layer depressed into contact with an illustrative conductive material.

As may be seen best from FIG. 4, when a human finger 92 depresses conductive region 42a, this portion of the conductive coating penetrates through a cavity in partition portion 65a until it contacts a conductive surface 110i. Conductive surface 110i in turn is in contact with negative terminal 110. Similarly, when the conductive region 42b is depressed that portion of the conductive coating penetrates through the cavity in partition portion 65b until it comes into contact with conductive surface 115i which is in contact with positive terminal 115. When cell portions 110i and 115i are simultaneously contacted by the respective conductive portions 42a and 42b, heating in conductive coating 40 occurs which in turn activates thermochromic coating 12. Although a dual activation design described herein is preferred, alternatively one end of the conductive coating may be permanently secured to the cell so that it is in permanent electrical contact with one of the cell's terminals. This can be accomplished by using conductive adhesive between a portion of conductive coating 40 and a cell terminal or portion of the cell in electrical contact with the terminal. The other end of the conductive coating or portion thereof could employ an activating mechanism, e.g. 75(a) or 75b, described hereinabove. In such embodiment, in order to activate the tester the user would need only depress one end of the label/tester composite 5.

An alternate preferred embodiment of the label/tester composite of the invention is composite 8 illustrated schematically in FIG. 7 which can be described with reference to FIGS. 8A–8C as follows. (The coatings shown in FIGS. 7 and 8A–8C having the same reference numbers as above discussed with reference to FIGS. 1 and 2A–2C can be of the same composition and applied by the same methods of printing as described in the foregoing.) The label/tester composite 8 (FIG. 8C) is constructed by first forming a first layered substructure 9 shown in FIG. 8B. Substructure 9 (FIG. 8B) is formed by applying a graphics print layer 6 to the inside surface of label 10 and then adhesive coating 20 onto print layer 6. (Preferred adhesive for coating 20 and preferred methods of application have been described in the foregoing.) A transferable layered substructure 36 on releasable web 18 may then be prepared by first applying a conductive coating (silver ink above described) onto a releasable (e.g. silicone coated) web 18 and then heat curing the coating to form cured conductive coating 40. (Substructure 36 or portion thereof may be referred to herein as a preform.) Then color coating 15 may be applied over conductive coating 40 and in turn thermochromic coating 12 applied over color coating 15. Substructure 36 (FIG. 8A) comprising coatings 12, 15, and 40 may then be transferred from release coated web 18 to layered substructure 9 by pressing thermochromic coating 12 of substructure 36 onto adhesive coating 20 of substructure 9 and then peeling away web 18. Thereupon dielectric coating 50 may be applied over the exposed conductive coating 40 and partition coating 60 may be applied over dielectric coating 50, thus forming the final label/tester composite illustrated in FIGS. 8 and 9C.

Figure 7:
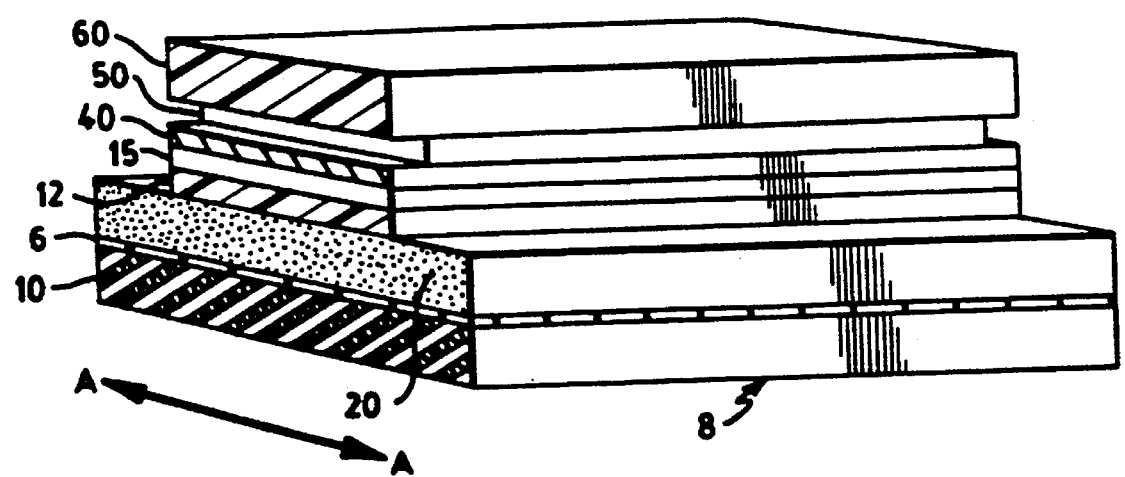
FIG. 7 is an isometric view of another embodiment of the cell tester integrated with the label forming the label/tester composite of the invention.
Figure 8A:
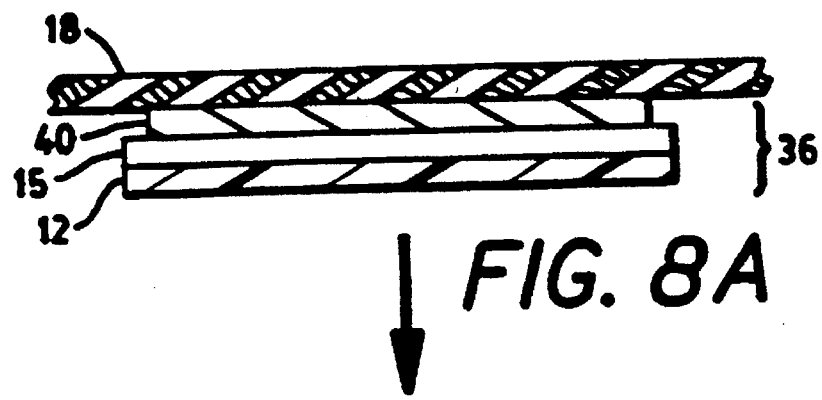
FIG. 8A is a schematic representation showing manufacture of a portion of the label/tester composite by transfer of the thermochromic coating and conductive coating from a release web to the partial composite of FIG. 8B.
Figure 8B:
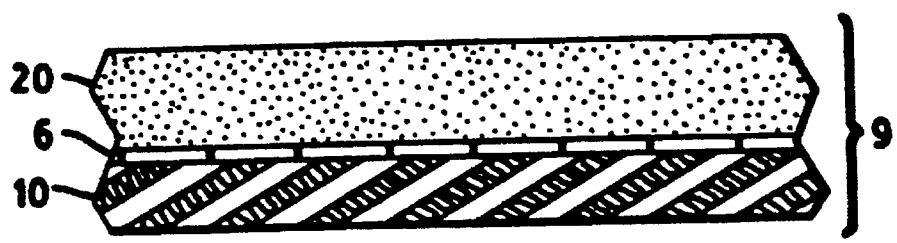
FIG. 8B is an end view of a portion of the label/tester composite shown in FIG. 7.
Figure 8C:
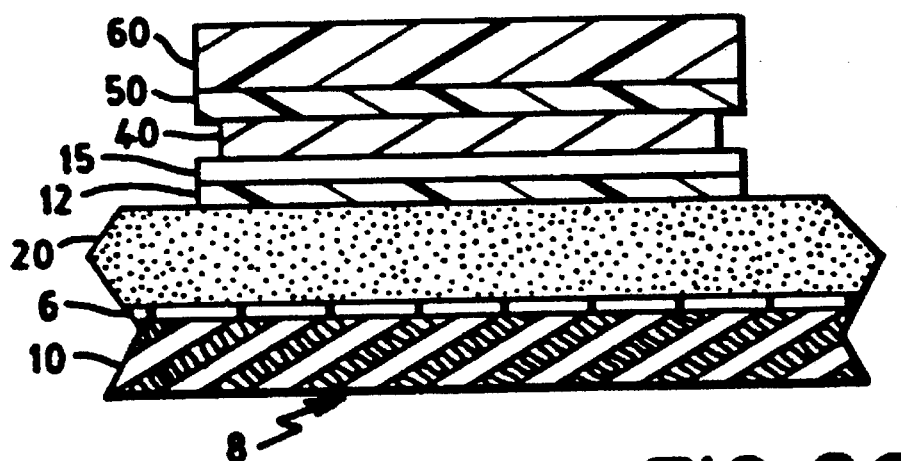
FIG. 8C is an end view of the completed label/tester embodiment of FIG. 7.
Figure 9:
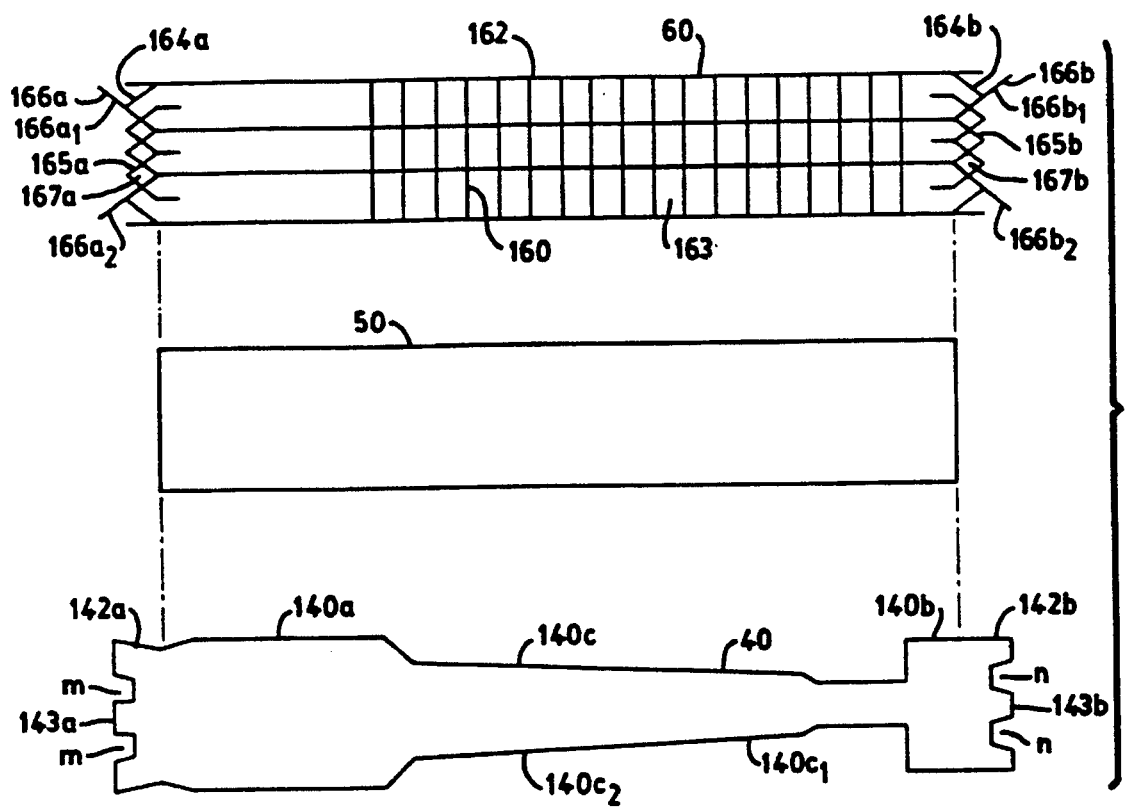
FIG. 9 are plan views of the partition coating, conductive coating and dielectric coating therebetween for the embodiment represented in FIG. 7.

A preferred configuration for the conductive coating 40, dielectric coating 50 and partition coating 60 referenced in FIGS. 7 and 8C is illustrated in FIG. 9. Partition coating 60 illustrated in FIG. 9 is formed of a body portion 162 and end portions 164a and 164b. Body portion 162 desirably has a thickness between about 1.5 mil (0.038 mm) and 7.0 mil (0.18 mm). Body portion 162 is preferably formed in a pattern of criss-crossed horizontal and vertical ribs which form a plurality of air pockets 163 which provide thermal insulation between the label/tester composite 8 and cell casing 80. End portions 164a and 164b are each located respectively at opposing extremities of coating 60 as illustrated in FIG. 9. End portions 164a and 164b each comprise respective partition end portions 165a and 165b and respective partition tip portions 166a and 166b. Partition end portions 165a and 165b form cavities 167a and 167b, respectively which are preferably of polygonal, rectangular, oval, elliptical, or circular shape. The partition end portions 165a and 165b form boundaries around one or more such cavities, i.e. spaces, in the partition coating 60 at opposing ends thereof. The area of these cavities (facing conductive coating 40) may be between about 1.5 $mm^2$ and 20.0 $mm^2$, preferably between about 8 and 20 $mm^2$, and form a part of extremities 175a and 175b, respectively. Partition tip portion 166a preferably comprises a pair of slanted ribs 166a$_1$ and 166a$_2$ which jut out from one end of the partition coating. Partition tip portion 166b preferably comprises a pair of slanted ribs 166b$_1$ and 166b$_2$ which jut out from the opposite end of the partition coating.

Electrically conductive coating 40 (FIG. 9) comprises a low resistance portion 140a and 140b at respective ends of the conductive coating and a high resistance portion 140c therebetween. The high resistance portion 140(c) has a gradually narrowing width along a major portion of the length of the conductive coating so that the narrower end 140c$_1$ will reach a higher surface equilibrium temperature than the wider end 140c$_2$ when the tester is activated. In the embodiment shown in FIG. 9, preferably two or more conductive fingers 143a jut out from the end of conductive portion 142a and similarly two or more fingers 143b jut out from opposing low resistance end 140b. The individual fingers 143a are separated from each other by small spaces (m) therebetween. Similarly individual fingers 143b are separated from each other by small spaces (n) therebetween. When the ends of the label/tester composite are heat shrunk over the cell shoulders 130 and 135, the spaces between each set of fingers become smaller, thus tending to merge the individual fingers in each set. The small spaces between the fingers prevent bulging or warping of the ends of the label/tester composite when heat is applied thereto to heat shrink those ends over the cell shoulders.

Figure 10:
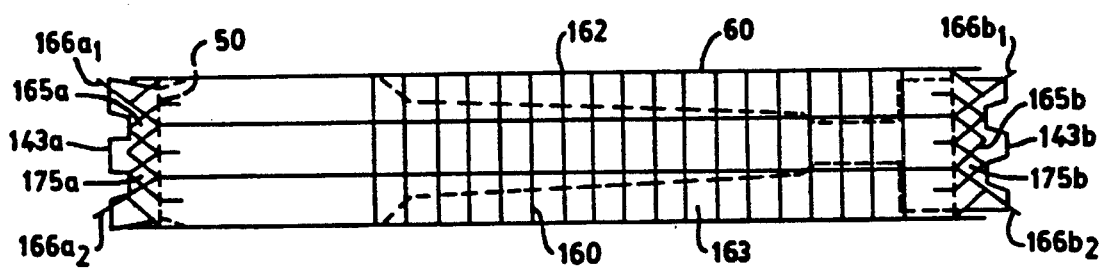
FIG. 10 is an assembled plan view of the coatings depicted in FIG. 9.

Coatings 40, 50 and 60 of FIG. 9 are shown assembled in FIG. 10. In this embodiment dielectric coating 50 is sandwiched between conductive coating 40 and partition 60. Dielectric coating 50 is shorter than both conductive coating 40 and partition coating 60. Thus, end portions of conductive coating 40, i.e. portion 142a and 142b as well as conductive fingers 143a and 143b can rest directly on the partiton coating, perferably with no intervening coatings therebetween. In this assembly, partition ribs $166_1$ and $166a_2$ provide support and electrical insulation for the overlying conductive coating 143a at one end of the tester. Partition ribs $16b_1$ and $166b_2$ provide support and electrical insulation for the overlying conductive Extremities 175a and 175b at opposing ends of the label/tester composite 8 are each comprised of partition end portion 165a and 165b, respectively, and a portion of the conductive coating, namely 142a and 142b, respectively. The partition end portions 165a and 165b have a thickness desirably between 0.1 mil (0.0025) and 2.0 mil (0.05 mm). Portions 165a mm) and 3.0 mil (0.075 mm). Similarly, portions 165b and 142b have a combined thickness between about 0.35 mil (0.009) and 3.0 mil (0.075 mm).

When the region of the label over conductive portion 142a is pressed, the conductive portion 142a pushes down through the underlying gap formed in partition 165a and passes therthrough until it makes electrical contact with a cell terminal or conductive surface in electrical contact with a cell terminal. When pressure is removed, the conductive portion returns to its original position above the partition surface. Conductive fingers 143a which rests on partition ribs $166a_1$ and $166a_2$ respectively, can also be to come into electrical contact with a cell terminal by pressing down on the portion of the label directly over said fingers. Thereupon, conductive portions 143a passes through the cavity in the partition coating between ribs $166a_2$ and $166a_2$ until it makes electrical contact with a cell terminal or conductive surface in electrical contact with a cell terminal. When pressure is removed conductive portion 143a returns to its original position above partition ribs $166a_1$ and $166a_2$. Conductive fingers 143b on the opposite end of the tester can be made to come into electrical contact with a cell terminal in the same manner by pressing down on the portion of the label directly over end portion 143b, whereupon said conductive fingers passes through the cavity in the partition coating between ribs $166b_1$ and $166b_2$ to make electrical contact with a cell terminal.

The label/tester composite 8 shown in the alternate embodiment of FIG. 7 may be applied to the cell in the same manner as described with reference to the embodiment of FIG. 1, namely by wrapping the label around the cell casing 80 with the adhesive side of the label in contact with the cell casing and then heat shrinking the ends of the label over the cell shoulders 130 and 135.

Although the present invention has been described with reference to specific embodiments and materials it should be understood that modification to these embodiments as well as substitute materials are possible. For example, having described the desired performance characteristics of the adhesive coating 20, it may become apparent to those skilled in the art that alternatives to the preferred pressure sensitive adhesives described herein are possible. Also although preferred specific materials have been described for the dielectric and partition coatings, it should be recognized that substitute materials within the concept of the invention are possible. Accordingly, the present invention is not intended to be limited to the specific embodiments and materials described herein, but is defined by the claims and equivalents thereof.

What is claimed is:

1. In combination, an electrochemical cell and a label/tester composite; said cell comprising a metal housing having a cylindrical wall with first and second shoulders at respective ends thereof; said label/tester composite being attached to the cell housing; said composite including a heat shrinkable base film, a thermochromic coating, a heat cured electrically conductive coating in thermal contact with the thermochromic coating, and means for maintaining said conductive coating spaced from the cell housing, said means electrically and thermally insulating said conductive coating from the cell housing.

2. The combination of claim 1 wherein said means for maintaining said conductive coating spaced from the cell housing comprises a coating of electrically insulating material having a plurality of cavities extending through the thickness thereof, wherein a portion of the conductive coating is positioned over at least one of said cavities; the tester being activatable by applying manual pressure over the conductive portion over said at least one cavity thereby causing it to be pushed through said cavity and electrically contact a cell terminal.

3. The combination of claim 2 wherein at least the majority of the remaining cavities in the coating of electrically insulating material form thermally insulating air pockets between the label/tester composite and the cell housing.

4. The combination of claim 2 wherein at least one of said cavities through which the tester is activatable has a surface area of between 1.5 and 20.0 $mm^2$ measured on the side of the cavity facing the conductive coating.

5. The combination of claim 2 wherein at least one of said cavities through which the tester is activatable has a depth between about 0.1 mil (0.0025 mm) and 2.0 mils (0.05 mm).

6. The combination of claim 2 wherein said cavity and said conductive portion have a combined depth of between about 0.35 mil (0.009 mm) and 3.0 mil (0.075 mm).

7. The combination of claim 2 wherein a major portion of the coating of electrically insulating material has a thickness between about 1.5 mil (0.038 mm) and 7 mil (0.18 mm).

8. The combination of claim 1 wherein the heat shrinkable base film is selected from the group consisting of unplasticized polyvinylchloride and polypropylene.

9. The combination of claim 1 wherein the heat shrinkable base film is printed with graphics on one side thereof and wherein the base film has pressure sensitive adhesive on the same side of the base film as the graphics, and said composite is attached to the cell by wrapping it around the cell housing so that the adhesive contacts the housing.

10. The combination of claim 1 wherein the label/tester composite has a thickness of less than 100 mils (2.5 mm).

11. The combination of claim 1 wherein said heat cured electrically conductive coating has a narrowing width along at least a portion of its length.

12. A label/tester composite for application to an electrochemical cell having a housing and a pair of terminals, said label/tester composite comprising a heat shrinkable base film and an adhesive coating over one side of the base film, a thermochromic coating, an electrically conductive coating in thermal contact with the thermochromic coating, and separation means for maintaining the conductive coating spaced from the housing when the composite is applied thereto, wherein the thermochromic coating, the electrically conductive coating, and said separation means are on the same side of the base film as the adhesive coating, wherein said conductive coating is formed on said base film by heat curing a conductive coating on a releasable web and transferring the cured conductive coating to said adhesive on said base film.

13. The label/tester composite of claim 12 wherein a portion of the adhesive coating over said base film is between the base film and the thermochromic coating.

14. The label/tester composite of claim 12 wherein a portion of the adhesive coating over said base film is between the thermochromic coating and the conductive coating.

15. The label/tester composite of claim 12, wherein said composite is in contact with the housing of an electrochemical cell, and said separation means contacts said housing, wherein said separation means comprises a coating of electrically insulating material having a plurality of cavities extending through the thickness thereof, wherein a portion of the conductive coating is positioned over at least one of said cavities, whereby the tester is activatable by applying manual pressure over the conductive portion over said at least one cavity thereby causing said conductive portion to be pushed through said at least one cavity and electrically contact a cell terminal.

16. The label/tester composite of claim 15 wherein at least a majority of the remaining cavities in the coating of electrically insulating material form thermally insulating air pockets between the label/tester composite and the cell housing.

17. The label/tester composite of claim 12 wherein said composite has a thickness between about 4 and 20 mils (0.1 and 0.5 mm).

18. An electrochemical cell condition tester on a heat shrinkable label comprising, on one side of said label, an adhesive coating, a thermochromic coating, a heat cured electrically conductive coating in thermal contact with the thermochromic coating, means for maintaining the conductive coating spaced from the housing of an electrochemical cell, and the conductive coating having at least two spaced apart fingers protruding from an end thereof whereby that end of the tester can be evenly heat shrunk over a shoulder of the cell.

19. The electrochemical cell condition tester of claim 18 wherein the label is of a material which is capable of shrinking when heated to a temperature below the curing temperature of the conductive coating.

20. The electrochemical cell condition tester of claim 18 wherein said heat cured electrically conductive coating has a narrowing width along at least a portion of its length.

21. In the combination of a heat shrinkable label and a thermally responsive cell condition tester for an electrochemical cell, wherein said tester comprises an electrically conductive layer in thermal contact with a thermochromic coating, and said tester is integrated on a side of the label forming a label/tester composite which is applied to an electrochemical cell housing, the improvement comprising said label tester composite having a coating of electrically insulating material separating the tester from the cell housing, said coating having a plurality of cavities extending through the thickness thereof, at least one of said cavities forming a region through which a portion of the conductive layer may be pushed to activate the tester and at least the majority of the remaining cavities forming thermally insulating air pockets between the label/tester composite and the cell housing.

22. A label/tester composite for an electrochemical cell, said cell comprising a metal housing having a cylindrical wall with first and second shoulders at respective ends thereof; said label/tester composite including a heat shrinkable base film, a thermochromic coating, a heat cured electrically conductive coating in thermal contact with the thermochromic coating, wherein the label is a material which is capable of shrinking at a temperature below the curing temperature of the conductive coating, and means for maintaining said conductive coating spaced from the cell housing, said means electrically and thermally insulating said conductive coating from the cell housing.

23. The label/tester composite of claim 22 wherein said heat cured electrically conductive coating has a narrowing width along at least a portion of its length.

\* \* \* \* \*